(12) United States Patent
Verhaeghe

(10) Patent No.: US 9,156,207 B2
(45) Date of Patent: Oct. 13, 2015

(54) REINFORCED SANDWICH STRUCTURE

(75) Inventor: Jan Verhaeghe, Beveren (BE)

(73) Assignee: Groep Stevens International, Lokeren (BE)

( * ) Notice: Subject to any disclaimer, the term of this patent is extended or adjusted under 35 U.S.C. 154(b) by 0 days.

(21) Appl. No.: 13/231,404

(22) Filed: Sep. 13, 2011

(65) Prior Publication Data

US 2012/0028023 A1 Feb. 2, 2012

Related U.S. Application Data

(60) Division of application No. 11/558,536, filed on Nov. 10, 2006, now Pat. No. 8,034,428, which is a continuation-in-part of application No. PCT/BE2005/000075, filed on May 11, 2005.

(30) Foreign Application Priority Data

May 11, 2004 (EP) .................................... 04447116

(51) Int. Cl.

| B29C 70/02 | (2006.01) |
|---|---|
| B29C 70/24 | (2006.01) |
| B29C 70/52 | (2006.01) |
| E04C 2/36 | (2006.01) |

(52) U.S. Cl.
CPC .............. *B29C 70/021* (2013.01); *B29C 70/24* (2013.01); *B29C 70/52* (2013.01); *E04C 2/36* (2013.01); *Y10T 428/23* (2015.01); *Y10T 428/23914* (2015.04); *Y10T 428/24033* (2015.01); *Y10T 428/249923* (2015.04); *Y10T 428/249958* (2015.04)

(58) Field of Classification Search
CPC ...... B29C 70/00; B29C 70/02; B29C 70/021; B29C 70/08; B29C 70/24; B29C 70/52; B29C 43/22
USPC ................ 264/165, 171.11; 428/86, 95, 223; 112/475.23, 410
See application file for complete search history.

(56) References Cited

U.S. PATENT DOCUMENTS

| 3,030,256 A | 4/1962 | Rosenthal ....................... 428/85 |
| 3,647,606 A | 3/1972 | Notaro ........................... 428/184 |
| 4,196,251 A * | 4/1980 | Windecker ............... 428/311.11 |

(Continued)

FOREIGN PATENT DOCUMENTS

| DE | 1704872 | 5/1971 |
| EP | 328921 A1 * | 8/1989 |

(Continued)

*Primary Examiner* — Cheryl Juska
(74) *Attorney, Agent, or Firm* — Thomas G. Peterson; Bradley Arant Boutt Cummings LLP

(57) ABSTRACT

A process for forming a reinforced sandwich structure which includes, stacked in height direction thereof, at least one top layer and at least one bottom layer including a fibrous reinforcing material, which top and bottom layer sandwich between them at least one core of a foamed material, the sandwich structure being impregnated with a resin material. The top and bottom layers of fibrous reinforcing material are forwarded along opposite top and bottom faces of the core material to form a multi-layer laminate. A plurality of inserts are inserted in longitudinal and/or transversal direction of the core material interconnecting the top and bottom layer and the core by applying reinforcing fibers at least part of which extend in height direction of the laminate, and the structure is impregnated with a plastic material.

13 Claims, 2 Drawing Sheets

(56) References Cited

U.S. PATENT DOCUMENTS

| | | | |
|---|---|---|---|
| 4,330,494 A | 5/1982 | Iwata et al. | |
| 4,876,973 A | 10/1989 | Marrache et al. | 112/470.13 |
| 4,888,228 A | 12/1989 | Sidles | 428/86 |
| 5,186,776 A | 2/1993 | Boyce et al. | 156/73.2 |
| 5,589,016 A | 12/1996 | Hoopingarner et al. | 156/87 |
| 5,624,622 A | 4/1997 | Boyce et al. | 264/258 |
| 5,736,222 A | 4/1998 | Childress | 428/119 |
| 5,738,924 A | 4/1998 | Sing | |
| 5,741,574 A | 4/1998 | Boyce et al. | 428/119 |
| 5,869,165 A | 2/1999 | Rorabaugh et al. | 428/105 |
| 5,935,680 A | 8/1999 | Childress | 428/119 |
| 6,027,798 A * | 2/2000 | Childress | 428/319.3 |
| 6,214,753 B1 | 4/2001 | Brenot et al. | 442/225 |
| 6,268,049 B1 | 7/2001 | Childress | 428/309.9 |
| 6,291,049 B1 * | 9/2001 | Kunkel et al. | 428/99 |
| 6,645,333 B2 | 11/2003 | Johnson et al. | 156/92 |
| 6,676,785 B2 | 1/2004 | Johnson et al. | 156/92 |
| 6,805,233 B2 | 10/2004 | Verhaeghe | 198/750.6 |
| 7,056,576 B2 | 6/2006 | Johnson | 428/309.9 |
| 7,070,845 B2 | 7/2006 | Thomas et al. | 428/69 |
| 7,105,071 B2 | 9/2006 | Johnson et al. | 156/92 |
| 7,217,453 B2 * | 5/2007 | Johnson et al. | 428/292.1 |
| 7,387,147 B2 | 6/2008 | Johnson et al. | 156/433 |
| 7,424,967 B2 | 9/2008 | Ervin et al. | 228/193 |
| 7,485,354 B2 | 2/2009 | Bohner et al. | 428/60 |
| 7,563,497 B2 | 7/2009 | Ma | 428/86 |
| 7,807,093 B2 * | 10/2010 | de Groot | 264/445 |
| 8,034,428 B2 * | 10/2011 | Verhaeghe | 428/86 |
| 8,127,450 B2 * | 3/2012 | Weber et al. | 29/897.32 |
| 8,448,989 B2 * | 5/2013 | Verhaeghe | 280/789 |
| 2002/0144767 A1 | 10/2002 | Johnson et al. | 156/148 |
| 2002/0153084 A1 | 10/2002 | Johnson et al. | 156/148 |
| 2004/0003885 A9 | 1/2004 | Johnson et al. | 156/148 |
| 2004/0234742 A1 | 11/2004 | Johnson | 428/292.1 |
| 2005/0006023 A1 | 1/2005 | Johnson et al. | 156/92 |
| 2005/0025948 A1 | 2/2005 | Johnson et al. | 428/223 |
| 2005/0074593 A1 * | 4/2005 | Day et al. | 428/292.1 |
| 2005/0260379 A1 | 11/2005 | Verhaeghe | 428/95 |
| 2007/0029024 A1 | 2/2007 | Johnson et al. | 156/92 |
| 2007/0090162 A1 | 4/2007 | Verhaeghe | 228/101 |
| 2007/0102094 A1 * | 5/2007 | de Groot | 156/73.1 |
| 2007/0292654 A1 | 12/2007 | Bohner et al. | 428/76 |
| 2009/0049757 A1 | 2/2009 | Potter | 52/2.23 |
| 2009/0071594 A1 | 3/2009 | Johnson et al. | 156/181 |
| 2009/0212533 A1 | 8/2009 | Verhaeghe | 280/423.1 |
| 2009/0218724 A1 * | 9/2009 | Weber et al. | 264/236 |
| 2010/0090452 A1 * | 4/2010 | Verhaeghe | 280/789 |

FOREIGN PATENT DOCUMENTS

| | | |
|---|---|---|
| EP | 672805 A1 * | 9/1995 |
| GB | 2267101 | 11/1993 |
| WO | WO 9919137 | 4/1999 |
| WO | WO 0147706 | 7/2001 |
| WO | WO 03097335 | 11/2003 |
| WO | WO 2005067545 A2 * | 7/2005 |

* cited by examiner

REINFORCED SANDWICH STRUCTURE

CROSS-REFERENCE TO RELATED APPLICATIONS

This application is a division of U.S. application Ser. No. 11/558,536, filed Nov. 20, 2006, now U.S. Pat. No. 8,034,428, which is a continuation-in-part of PCT Application Serial No. PCT/BE2005/000075, filed May 11, 2008, each of which are hereby incorporated by reference.

BACKGROUND

The present invention relates to a reinforced sandwich structure comprising stacked in height direction thereof at least one top sheet and at least one bottom sheet comprising a fibrous reinforcing material, which top and bottom sheet sandwich between them at least one core of a foamed material, which sandwich structure is impregnated with a resin material to connect the top sheet to a top face of the core and the bottom sheet to a bottom face of the core, as disclosed in the preamble of the first claim.

DE1704872 discloses a method for producing a sandwich panel comprising a core of a foamed plastic material sandwiched between a top and a bottom sheet of a fibrous reinforced polyester resin. The sandwich panel is produced by aligning a plurality of cores of a foamed plastic material in such a way that the longitudinal axes of adjacent blocks run parallel to each other. Between adjacent blocks, a cross plate is applied and the edges of the core running along the cross plates are chamfered. In the tope and bottom face of each block a plurality of a parallel grooves is applied. A layer of an adhesive is applied to the face of the blocks facing the bottom sheet and the facing side faces of adjacent blocks. Thereafter a layer of an adhesive is applied to the top face of the blocks facing the top sheet. It is alleged that the adhesive fills the grooves and the space between adjacent blocks.

The sandwich panel disclosed in DE1704872 however presents the disadvantage that the production of the sandwich panel is too time consuming and laborious. Moreover, since the top and bottom cover sheets are connected to the core by means of an adhesive layer only, the sandwich panel is susceptible to de-lamination.

WO95/20486 discloses a structural honeycomb sandwich construction comprising outer layers of plywood, metal, plastic, various composition boards, cements and laminations of any combination of these. The outer layers sandwich between them core elements which assume an overall openwork patter formed from natural wood veneer, veneer formed from wood fibers or shavings combined with synthetic resins, wood shavings into selected geometric shapes or formed from bamboo into rings. The core elements may be secured to each other and to the outer facings by means of a resin and may be reinforced by a fibrous reinforced resin.

However, the above disclosed prior art processes are non-continuous, laborious and time consuming. There is thus a need to a process for producing sandwich structures, which is economically feasible and permits mass production of sandwich structures in a substantially continuous process.

From PCT/BE03/00092 a sandwich panel is known which comprises a top and a bottom layer enclosing a core. The top and bottom layer each comprise a fibrous reinforcing material and are connected to each other and to the core by means of tufting using a tow or yarn of fibrous reinforcing material, after which the sandwich panel is impregnated with a thermosetting resin using pulltrusion and cured.

However, the stiffness of the known sandwich panels is determined by the stiffness provided by its components, in particular the core, the fibrous reinforcing material of the top and bottom layer, and the fibrous reinforcing material used for the tufting and the resin. In particular the bending stiffness is determined by formula 1:

$$D = \frac{t_1 t_2 E_1 E_2 (h+c)^2}{4(t_1 E_1 + t_2 E_2)}$$

$t_1$, $t_2$: thickness of top and bottom sheet
$E_1$, $E_2$: Elasticiteitsmodulus of top and bottom sheet
h: Total thickness of the sandwich panel
c: thickness of the core The deflection of the sandwich panel with simply supported ends under a uniform transverse load (i.e. loan P on the floor of a trailer) is described by formula 2:

$$w = \frac{5Pa^3}{384Db}\left[1 + \frac{192cD}{5a^2 G_e (h+c)^2}\right]$$

a: span length
$G_c$: Shear Modulus of the core Material
b: Width of the sandwich panel

BRIEF SUMMARY

There is however a need for a sandwich structure having a stiffness and bending resistance which can be adapted in function of the intended application for the sandwich structure.

It is therefore the object of the present invention to provide a sandwich structure with an adaptable stiffness and bending strength, which takes into account the intended use of the sandwich structure.

This is achieved with a sandwich structure showing the technical features of the characterizing part of the first claim.

Thereto, the sandwich structure of the present invention is characterized in that the at least one core material comprises at least one insert which extends in height direction of the reinforced sandwich structure over at least part of the height thereof and in at least one of the longitudinal and transversal direction of the structure, and in that the at least one top layer, the at least one bottom layer and the at least one core material comprise at least one insert and are connected to each other by means of reinforcing fibres, wherein at least part of the fibres extend in height direction of the sandwich structure.

The presence of such an insert in the core material of the reinforced sandwich structure has been found to improve the bending resistance and stiffness of the structure. Thereby it has been found that the improvement is not limited to the direction in which the inserts extend, but that it extends to a wide variety of other directions. It has further been found that the presence of these inserts contributes to increasing the shear resistance of the core. Shear forces are particularly important with a core made of a foamed plastic and may cause the formation of unwanted smaller or larger cracks in the core material, in particular with a core comprising a foamed material. The presence of the claimed inserts further contributes to improving the resistance of the reinforced sandwich structure against fatigue. Fatigue stresses often entail an unwanted weakening and deflection of a sandwich structure.

In terms of formula 2, with the present invention Gc, the representative shear modulus of the core may be improved by one to two orders of magnitude. Besides the increase in D due to the added material of the inserts in the cross section, the improved Gc causes the second term in the above equation given between the brackets, "the so-called shear deformation", to become very small.

The presence of the inserts has the result that the stiffness and bending resistance of the over-all sandwich structure is improved. Thereby it has been found that the improved stiffness is not limited to the direction in which the inserts extend, but that it extends to a wide variety of other directions. It is remarked that an essential part of the insert is integrated within the interior of the support panel structure.

The inventor has found that the sandwich structure of this invention can also be built in such a way that it is capable of functioning as a shock or force absorber. A shock or force exerted in a direction perpendicular to the insert, is absorbed by a local deformation, often a local bending of the insert which may extend into the surrounding foam and into adjacent inserts or not, the deformation in adjacent areas and inserts decreasing with increasing distance from the point where the force occurred. In other words, the inventors have observed that the reinforced sandwich structure is locally compressible in the direction perpendicular to the direction in which the insert extends.

In a preferred embodiment of the invention the sandwich structure comprises in the vicinity where the shock or force is to be exerted, at least one reinforcing insert which extends in the direction of the force exerted to the panel and at least one reinforcing insert which extends in a direction perpendicular thereto. Preferably a plurality of such inserts are present in the foamed part of the sandwich panel, whereby the inserts preferably run substantially parallel. Those inserts will absorb forces exerted in longitudinal direction to the panel, by showing local deformation (local bending), which deformation decreases with increasing distances from the force. Thus the force is absorbed by the surrounding part of the support structure. The transversely extending inserts introduce local resiliency and the ability of the panel structure to deform locally in longitudinal direction, whereby the deformation is absorbed by the neighbouring structure. Thus with the present invention, a sandwich structure is provided which shows intrinsic resiliency. The foam properties may thereby be chosen such that the risk to an over-all deformation of the sandwich panel is minimal. If so desired however, local over-all deformation may be permitted to some extent.

It has further been found that the presence of the claimed inserts contributes to decreasing the shear forces occurring in the sandwich panel, the occurrence of shear forces being inherent to the presence of the top and bottom layer. Shear forces appear to be particularly important with a panel made of a foamed plastic, and to involve the formation of unwanted smaller or larger cracks in the foam. The presence of the inserts further contributes to improving the resistance of the panel against fatigue. Fatigue stresses often entail an unwanted weakening and deflection of a sandwich panel.

In the sandwich structure of the present invention it is preferred that the at least one bottom layer and the at least one core material comprising at least one insert are connected to each other by means of substantially continuous reinforcing fibers, at least part of which extend in height direction of the sandwich structure, as the use of substantially continuous fibers permits producing the sandwich structure in a substantially continuous process.

A preferred connection technique is the technique of tufting. Tufting namely permits a speedy processing of sandwich structures having large dimensions, for example lengths of 20 or 50 meter or more and widths of one to a few meter, in a continuous process on an industrial scale. Besides this, the tufting process has been found particularly suitable for use in combination with the process of pulltrusion used for impregnating the laminate with resin, although pulltrusion is a stepwise, non-continuous technique whereas tufting is a continuous technique, wherein threaded needles are continuously inserted in and withdrawn from the structure that is being tufted. It has namely been found that during tufting, all needles of at least one row of needles are simultaneously inserted into the laminate, and simultaneously lifted from the laminated after having produced the tuft. This lifting step permits that the laminate is advanced by the stepwise operating pullers to resin impregnate the laminate using pulltrusion. Furthermore, in a tufting device part or all of the tufting needles may be temporarily inactivated so that the risk that any of the needles contacts the inserts and gets damaged may be minimized, if necessary.

It has been found particularly advantageous that the technique of tufting permits to locally increase the fibre density in thickness direction of the sandwich laminate. In particular such a local fibre density increase may be achieved by locally increasing the number of tufts used to interconnect the top layer, bottom layer and core. Another way of locally increasing the density of the fibres which extend in Z-direction is to use as an insert at least one entity comprising a core material chosen from the group of metal, foamed metal, fibrous reinforcing material, plastic material or foamed plastic material enveloped in a fibrous reinforcing material, where the enveloping material is fastened to the core material by means of tufted reinforcing fibers.

Other preferred embodiments of the invention are disclosed in the appending claims.

A further object of the invention is to provide a substantially continuous process for producing sandwich structures.

Therefore, the present invention also relates to a process for manufacturing the afore mentioned sandwich structure.

A possible method for producing the sandwich structure of this invention comprises the steps of (1) forwarding the core material,
(2) forwarding the tope and bottom layer of fibrous reinforcing material along opposite sides of the core material to form a multi layer laminate,
(3) inserting at least one insert which extends in longitudinal and/or transversal direction of the sandwich structure,
(4) connecting the top and bottom layer to the core and to each other,
(5) impregnating the thus obtained structure with a plastic material.

An economically feasible technique for connecting the top and bottom layer to the core and to each other is the technique of tufting, as this is has been found particularly suitable for use with the process of pultrusion. The process of pultrusion is a preferred technique when envisioning producing structures with a long length. The structures can be fed through the pultrusion device in a continuous manner, the use of a mould for shaping the product can be dispensed with.

The reinforcing structures are mounted within the interior of the integrated structure. As such, for the first time a support panel structure is provided, which is suitable for use as a mounting surface and which may be produced as a single pieced, in a continuous process. This reduces production cost considerably.

According to a preferred method of this invention the laminate is only impregnated with a resin material using pulltrusion, after the top and bottom layer and core have been interconnected. In that way the risk to contamination of the futging device or of part or all of the tufting needles with resin or damaging the needles, may be minimized.

BRIEF DESCRIPTION OF THE DRAWINGS

The invention is further illustrated in the appending figures and description of the figures.

DETAILED DESCRIPTION

Figure 1:
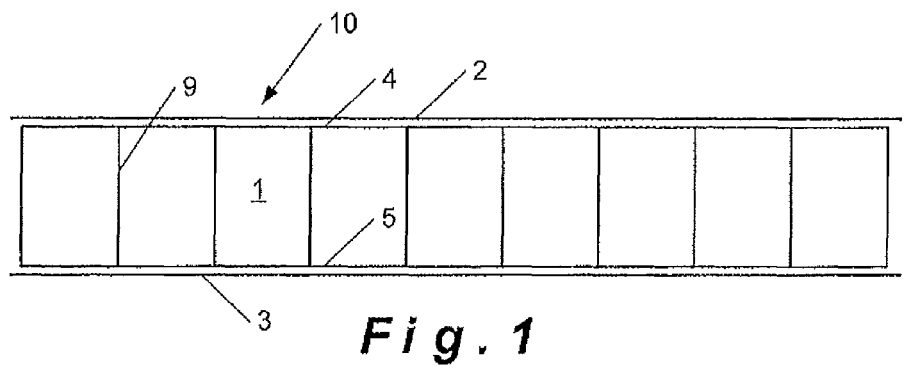
FIG. 1 is a cross section of an embodiment of the sandwich structure of this invention.

The reinforced sandwich structure 10 of this invention comprises a core 1 having a top face 4 and a bottom face 5. To the top face 4 a first top layer 2 of the sandwich structure 10 is fastened. To the bottom face 5, a bottom layer 3 of the sandwich structure 10 is fastened.

The core 1, tope layer 2 and bottom layer 3 may be interconnected using conventional fastening techniques known to the person skilled in the art. Examples of known fastening techniques include stitching or needling using a substantially continuous or a non-continuous fibrous reinforcing material. However it is preferred to interconnect top and bottom layer 2, 3 and core 1 by means of tufting using a substantially continuous tow or thread, preferably a substantially continuous fibrous reinforcing material as with this technique the connecting fibrous reinforcing material gets anchored into the top and bottom layer. Thereby, the fibrous reinforcing material may mainly extend in Z-direction, or part of the fibrous reinforcing material may slant with respect to eth Z-direction if so desired. If so desired, the core 1, top and bottom layer 2, 3 may however also be connected by means of stapling or any other equivalent connection technique. The connection preferably extends through the core 1, the top layer 2, 3 may however also be connected by means of stapling or any other equivalent connection technique. The connection preferably extends through the core 1, the top layer 2 and bottom layer 3. It is however also possible to individually connect the top and bottom layer 2, 3 to the core 1. If so desired, the tope and/or bottom face of the sandwich structure may be covered with a layer of a finishing material.

As the substantially continuous fibrous tufting material, use can be made of fibrous materials in the form of tows, threads, bundles, yarns or rovings, comprising a plurality of fibre bundles or twined or torsioned fibres, which may be built up of a single material or a combination of two or more different materials. The angle under which twined fibres extend with respect to each other will be adapted taking into account the envisaged compressive strength.

The nature of the fibrous material used is not critical to the invention, and may be selected from natural fibres, for example wool, cotton, flax fibres etc; mineral fibres, carbon fibres, metal fibres, glass fibres or synthetic fibres, for example polyester, polypropylene, polyethylene, polamide, or mixtures of two or more of these fibres. However, because of its high impact strength the use of aramid fibres is preferred. The positioning of the connection is not critical to the invention, although it may be preferred to group the fibrous material connecting the top and bottom layer and core in certain patterns, or in groups or columns of three or four or more fibres or fibre strands or tows. In that case the fibre columns further improve the resistance of the sandwich structure to kinking or bending.

As is shown in the FIGS. 1-6, the sandwich structure 1 of this invention may contain one single or a plurality of inserts 9 which extend in height direction of the structure and in at least one of the longitudinal and transversal direction of the structure 1. The inserts 9 may however also extend in both the longitudinal and transversal direction of the structure 1 and in any other direction ought suitable by the person skilled in the art taking into account the envisaged application of the sandwich structure 10. The at least one insert 9 may be positioned such that it extends mainly in transverse direction of the reinforced sandwich structure, or mainly in longitudinal direction, or in a direction which slants with respect to the longitudinal and/or transverse direction. However, within the scope of the present invention a plurality of inserts 9 may be present which extend in two or more of the afore mentioned directions; thereby the two or more inserts may be positioned adjacent one another or spaced from each other, depending on the envisaged use of the reinforced sandwich structure. Within the framework of this invention it is also possible to stack one or more inserts on top of each other within the core, or to position consecutive inserts in such a way that they at least partly overlap. In that way locally a higher strengthening may be achieved. Within the framework of this invention it is further possible to position two or more inserts in such a way that their longitudinal side faces lay against each other. The inserts 9 may be positioned at a regular distance from each other, or at varying distances. In case locally a higher stiffness is required, the number of and distance between adjacent inserts 9 may be amended.

Figure 5:
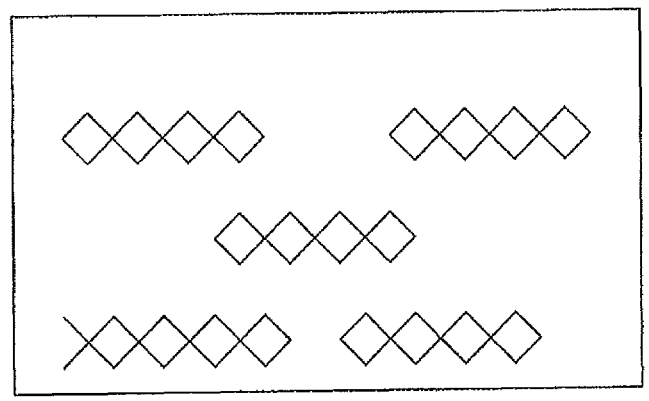
Figure 6:
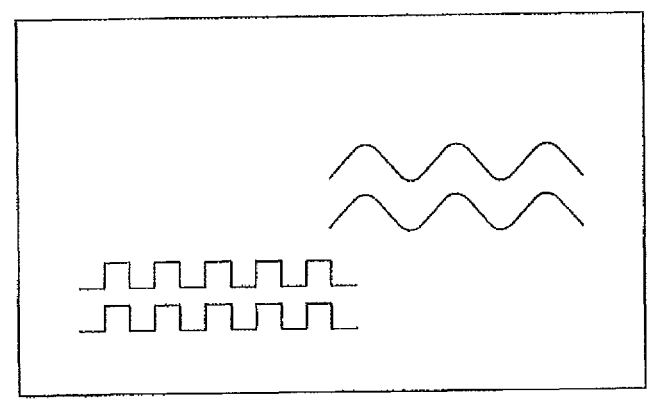

The insert 9 may be made of a wide variety of materials available to the person skilled in the art and take a wide variety of shapes. The insert 9 may for example be made as a strip or plate, perforated or not; a net or a grid, for example a stamped grid or a grid made of interconnected bars or wires, whereby the grid may extend in only two or in three dimensions. The insert 9 can be made as a mainly flat or pre-shaped strip, plate, net or grid. The insert 9 may for example be made as a zig-zag extending strip, whereby subsequent inserts 9 extend parallel to each other as is shown in FIG. 5, point towards or from each other as is respectively shown in FIGS. 4 and 5. Inserts 9 may however also be positioned in a staggered configuration. The insert 9 may further be shaped in such a way that facing inserts form a honeycomb-like structure in case a structure having a high strength is envisaged (see FIG. 3). The insert may have the shape of a wave, a rectangular or square wave as is shown in FIG. 6 or any other shape ought suitable by the person skilled in the art. The insert 9 can also be formed as a three-dimensional grid.

The insert 9 may be made of a wide variety of material, for example steel, stainless steel, iron or any other metal ought suitable by the person skilled in the art. The insert 9 may also be made of a plastic material, for example a thermosetting resin or a thermoplastic material or a fibrous reinforced thermosetting resin or thermoplastic material. The person skilled in the art will be able to select the most appropriate material for the insert 9 depending on the envisaged application for the sandwich structure.

The insert 9 may however also take the shape of a block, or an enveloped block. A suitable example of such an insert is a block comprising a foamed material, for example a foamed plastic or metal or a mixture of these materials, which is received in an envelope of fibrous reinforcing material. The block may be impregnated with a thermosetting resin or a thermoplastic material. Suitable thermosetting materials for use in the present invention include thermosetting unsaturated polyester resins, vinylester resins, epoxy resins, phenolic resins, polyurethane resins.

Figure 2:
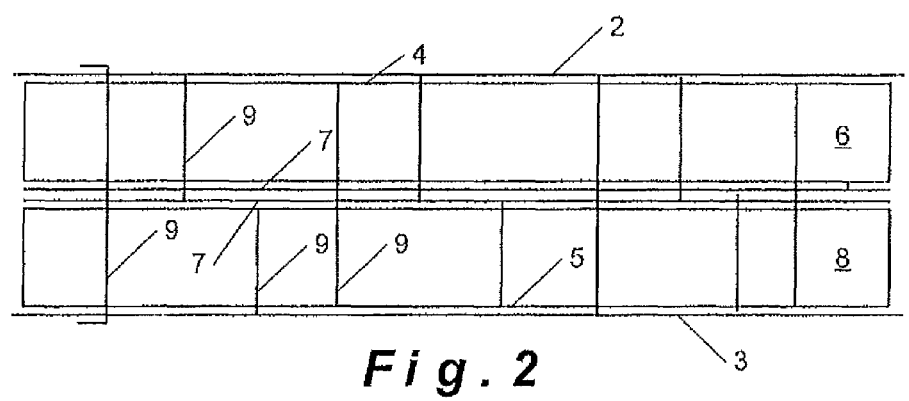
FIG. 2 is a cross section of another embodiment of the sandwich structure of this invention.
Figure 3:
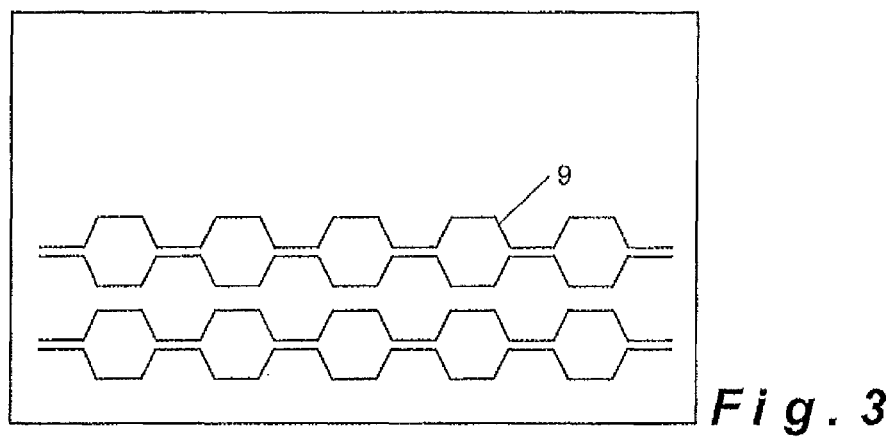
FIG. 3 is a top view to an embodiment of the sandwich structure of this invention.
Figure 4:
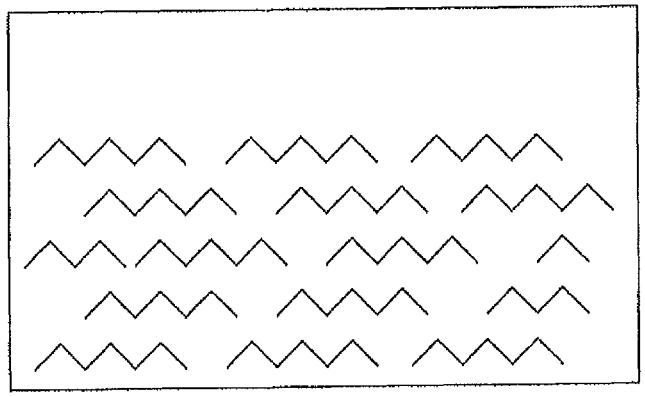
FIG. 4-6 show a top view to further embodiments of the sandwich structure of this invention.

The insert 9 may have the same height as the sandwich structure 10 as is shown in FIG. 1. The insert 9 may however also have a smaller height and be completely enveloped by the sandwich structure, as is shown in FIG. 2. This will for example also be the case when tow or more inserts are stacked on top of each other within the core. To save material, without this going at the expense of the stiffness of the sandwich structure 10, it is however possible to have subsequent inserts alternatingly depending from the top layer 2, the bottom layer 3 and countersunk within the core 1 of the structure 10, taken in cross direction thereof. The insert 9 may however also extend form the top and bottom layer 2, 3. In that case, the end parts protruding from the top and bottom layer 2, 3 will be bent to follow the surface of the top and bottom layer 2, 3 as is shown in FIG. 2.

The insert 9 may extend in longitudinal and/or in transverse direction of the sandwich structure 10, depending on the envisaged use of the structure. The insert 9 may extend in longitudinal direction of the sandwich structure 10 and have the same, a larger or a smaller length than the sandwich structure. With inserts 9 having a smaller length and/or positioned in a staggered configuration there is a minimum risk to cutting the sandwich structure by the inserts 9.

The material of which the core 1 is made is not critical to the invention. It is however preferred to make the core 1 of a foamed material, because of the reduced density and weight. Suitable foamed materials include metal foams, for example aluminum foam, or plastic foam, for example polyurethane foam, polyethylene foam, polypropylene foam, a foam of an ethylene-propylene copolymer, phenol foam, or any other plastic foam known to the person skilled in the art. The core 1 may however also be made of a mixed metal-plastic foam.

The core may be made of essentially one piece and of essentially one material. It is however also possible to use a core 1 comprising two or more layers 6, 16 stacked on top of each other and enclosing at least one layer 7 of fibrous reinforcing material between them. The two or more superimposed layers 5, 6 may be made of the same or a different material. The fibrous reinforcing material 7 may be the same material as used in the top and bottom layer 2, 3 or a different material.

The top and bottom layer 2, 3 comprise at least one layer of a fibrous reinforcing material, and may comprise a plurality of superimposed layers of such material. The fibrous reinforcing material will usually take the shape of a fleece, a net, a braiding, a fabric, a mat or a sheet. The fibrous reinforcing material may be a woven or a non-woven product. The top and bottom layer 2, 3 of the sandwich structure 10 may be made of the same or a different fibrous reinforcing material. It is further possible to have one or more of the face layers built up of alternating first and second materials, for example alternating glass fibre mats and mats comprising a mixture of glass fibre and metal fibre. However, such a fibrous reinforcing material may also be present at a more central position of the laminate.

The nature of the material of which the fibrous reinforcement of the top and bottom layer 2, 3 are made is not critical to the invention and may be chosen from natural fibres, for example cotton fibre, flax, wool, carbon fibres; mineral fibres, for example glass fibres or fibres made of plastic material for example polyester, polypropylene, polyethylene, polyamide. The top and bottom layer 2, 3 may however also comprise a combination of two or more of the above mentioned materials. The top and bottom layer 2, 3 may be pre-impregnated with a thermoplastic or thermosetting resin or not, which may be a woven or non-woven product.

The tufted fibres preferably extend in height direction of the reinforced sandwich structure, which means that they may extend in z-direction but also in any other direction which slants more or less with respect to the z-direction. Thus, the reinforced sandwich structure of the present invention is strengthened in X and Y direction by means of the plies of top and bottom layers, and in Z-direction by the presence of the tufted fibres or piles.

The reinforcing fibres used to interconnect the bottom layer, top layer and core material, which extend in height direction of the reinforced sandwich structure are anchored into structure by impregnating the reinforced sandwich structure 10 with a plastic material. Thus a structure is obtained showing an improved impact resistance.

The plastic materials used to impregnate the insert may be a thermosetting or thermoplastic resin. Suitable thermosetting materials for use in the present invention include thermosetting unsaturated polyester resins, vinylester resins, epoxy resins, phenolic resins, polyurethane resins.

The reinforced sandwich structure of the present invention is suitable for use in a wide variety of applications, for example as construction walls or flooring construction in building or container construction, for manufacturing columns for electricity transmission and distribution, for use as flooring material that is subjected to high loads, for example structures used as top surface for temporary or permanent airport landing and take off strips, bridge decks, a parking deck, an airplane wing, a roof construction or any other constructive part.

A possible process for producing the reinforced sandwich structure of this invention comprises the steps of
(1) forwarding the core material 1,
(2) forwarding the top and bottom layer 2, 3 of fibrous reinforcing material along opposite sides of the core material 1 to form the sandwich,
(3) inserting a plurality of inserts 9 in longitudinal and/or transversal direction of the sandwich structure 10
(4) interconnecting the top and bottom layer 2, 3 to the core 1
(5) impregnating the thus obtained structure with a plastic material.

Insertion of the inserts 9 may be done in various ways known to the person skilled in the art. It is possible to insert the inserts 9 after the foamed core 1 has been produced. It is however also possible to add the inserts 9 when producing the foamed core 1.

It is however preferred that after the top and bottom layer and core have been interconnected, the laminate is impregnated with a resin material using pultrusion, to minimize the risk to damaging the needles used in the tufting process.

Furthermore, in particular where use is made of an insert comprising a foamed core enveloped in a sheet of a fibrous reinforcing material, it is advantageous to connect the top and bottom sheet of the core of the reinforced sandwich structure and the enveloping sheet of reinforcing material to the core of the inset, in one go using the process of tufting.

The present invention also relates to a reinforced product comprising stacked on top of each other and fastened to each other, two or more reinforced sandwich structure as described above, arranged in such a way that a bottom layer of a top reinforced sandwich structure is fastened to a top layer of a lower reinforced sandwich structure. If so desired, the stacked reinforced sandwich structures are over-wrapped with a fibrous reinforcing material and impregnated with at least one resin.

The invention claimed is:

1. A process for producing a reinforced sandwich structure comprising stacked in height direction thereof, at least one top layer and at least one bottom layer comprising a fibrous reinforcing material, which top and bottom layer sandwich between them at least one core of a foamed material, which sandwich structure is impregnated with a resin material, characterised in that the process comprises the steps of: forwarding the core material, forwarding the top and bottom layer of fibrous reinforcing material along opposite top and bottom faces of the core material to form a multi layer laminate, inserting a plurality of inserts in longitudinal and/or transversal direction of the core material, wherein the insert comprises at least one core of the insert comprising plastic, metal, or a mixture of both, said core of the insert enveloped in at least one sheet of a fibrous reinforcing material, and interconnecting the top and bottom layers and the sandwich core having the plurality of inserts inserted therein by applying reinforcing fibres at least part of which extend in height direction of the laminate.

2. The process as claimed in claim 1, characterised in that after the top and bottom layer and sandwich core have been interconnected, the laminate is impregnated with a resin material using pulltrusion.

3. A process as claimed in claim 1 characterised in that the top and bottom layer and the sandwich core are interconnected by means of tufting of reinforcing fibres, where at least part of the fibres extend in height direction of the laminate.

4. The process as claimed in claim 3, characterised in that after the top and bottom layer and core have been interconnected, the laminate is impregnated with a resin material using pulltrusion.

5. The process as claimed in claim 1 characterised in that the top and bottom layer and the sandwich core of the core of the reinforced sandwich structure and said enveloping sheet of fibrous reinforcing material of the core of the insert are interconnected by means of tufting of reinforcing fibres, where at least part of the fibres extend in height direction of the laminate.

6. The process as claimed in claim 5, characterised in that after the top and bottom layer and the sandwich core have been interconnected, the laminate is impregnated with a resin material using pulltrusion.

7. The process as claimed in claim 1, wherein the insert comprises at least one core of the insert, said core of the insert enveloped in at least one sheet of a fibrous reinforcing material and wherein the top layer, the bottom layer, the sandwich core and the enveloping sheet, are interconnected simultaneously by means of tufting.

8. The process as claimed in claim 1, wherein the top layer, the bottom layer, the sandwich core, the enveloping sheet, and the core of the insert are interconnected simultaneously by means of tufting.

9. The process as claimed in claim 2, wherein the insert comprises at least one core of the insert, said core of the insert enveloped in at least one sheet of a fibrous reinforcing material and wherein the top layer, the bottom layer, the sandwich core and the enveloping sheet are interconnected simultaneously by means of tufting.

10. The process as claimed in claim 3, wherein the insert comprises at least one core of the insert, said core of the insert enveloped in at least one sheet of a fibrous reinforcing material and wherein the top layer, the bottom layer, the sandwich core and the enveloping sheet are interconnected simultaneously.

11. The process as claimed in claim 4, wherein the insert comprises at least one core of the insert, said core of the insert enveloped in at least one sheet of a fibrous reinforcing material and wherein the top layer, the bottom layer, the sandwich core and the enveloping sheet are interconnected simultaneously.

12. The process as claimed in claim 5, wherein the top layer, the bottom layer, the sandwich core, the enveloping sheet, and the core of the insert are interconnected simultaneously.

13. The process as claimed in claim 6 wherein the top layer, the bottom layer, the sandwich core, the enveloping sheet, and the core of the insert are interconnected simultaneously.

* * * * *